(12) United States Patent
Aldridge et al.

(10) Patent No.: US 6,952,505 B2
(45) Date of Patent: Oct. 4, 2005

(54) INTERFACING OPTICAL TRANSMISSION STRUCTURES

(75) Inventors: Nigel Bruce Aldridge, Glouchestershire (GB); Geoffrey Martland Proudley, Gloucestershire (GB); Peter David Foote, Monmouth (GB); Ian James Read, Bristol (GB)

(73) Assignee: BAE Systems plc, Farnborough (GB)

( * ) Notice: Subject to any disclaimer, the term of this patent is extended or adjusted under 35 U.S.C. 154(b) by 148 days.

(21) Appl. No.: 10/088,226

(22) PCT Filed: Jan. 5, 2001

(86) PCT No.: PCT/GB01/00035

§ 371 (c)(1),
(2), (4) Date: Mar. 19, 2002

(87) PCT Pub. No.: WO01/51976

PCT Pub. Date: Jul. 19, 2001

(65) Prior Publication Data

US 2002/0150332 A1 Oct. 17, 2002

(30) Foreign Application Priority Data

Jan. 11, 2000 (GB) .............................................. 0000405

(51) Int. Cl.[7] .............................. G02B 6/28; G02B 6/42
(52) U.S. Cl. .............................. 385/14; 385/88; 385/89
(58) Field of Search ............................. 385/14, 31, 42, 385/44–45, 88–89, 92–93, 36, 129–131, 24

(56) References Cited

U.S. PATENT DOCUMENTS

| | | | | |
|---|---|---|---|---|
| 4,496,211 A | * | 1/1985 | Daniel ........................ | 385/31 |
| 4,533,208 A | | 8/1985 | Stowe ...................... | 350/96.16 |
| 4,753,497 A | | 6/1988 | Fujii et al. ............... | 350/96.15 |
| 4,779,945 A | | 10/1988 | Hill et al. ................ | 350/96.15 |
| 4,784,454 A | * | 11/1988 | Dyott ........................ | 385/31 |

(Continued)

FOREIGN PATENT DOCUMENTS

| | | |
|---|---|---|
| EP | 0 497 011 A1 | 1/1991 |
| EP | 0 603 549 A1 | 11/1993 |

(Continued)

OTHER PUBLICATIONS

"Low–loss single–mode optical couplers" G. Georgiou et al—IEE Prceedings, vol. 132, Pt. J., No. 5, Oct. 1985, pp. 237–302.
"Filter–Embedded Design and Its Applications to Passive Components" H. Yanagawa et al, 1989 IEEE, pp 1646–1653.
"Optical Transmission System for Interconnecting Electronic Units" L. Balliet et al; IBM Technical Disclosure Bulletin, vol. 26, No. 4, Sep. 1983, pp 1793–1796.
International Search Report.
British Search Report.
European Search Report.
PCT Written Opinion.

*Primary Examiner*—Joseph Williams
*Assistant Examiner*—Dalei Dong
(74) *Attorney, Agent, or Firm*—Crowell & Moring LLP (57) ABSTRACT

A composite for use in the aircraft construction industry includes an optical transmission device, such as an optical fiber, embedded within a carrier. The optical transmission device is provided with a high-quality optical interface surface which provides for optical connection to the optical transmission means from outside the carrier. The optical interface surface is provided as part of a micro-optical component which processes the optical signals to improve light extraction from a supply to the optical transmission means. The buried optical transmission device is accessed by a passageway formed in the carrier to the interface surface. If the passageway is formed prior to completion of finishing processes on the composite, a protective plug is provided to close the passageway until the optical connection is required.

13 Claims, 6 Drawing Sheets

U.S. PATENT DOCUMENTS

| | | | | |
|---|---|---|---|---|
| 4,993,796 A | * | 2/1991 | Kapany et al. | 398/82 |
| 5,125,054 A | | 6/1992 | Ackley et al. | 385/49 |
| 5,251,278 A | | 10/1993 | Samborsky | 385/48 |
| 5,253,310 A | * | 10/1993 | Delbare et al. | 385/14 |
| 5,299,271 A | | 3/1994 | Hildebrand | 385/12 |
| 5,299,273 A | | 3/1994 | Evans | 385/12 |
| 5,473,721 A | | 12/1995 | Myers et al. | 385/129 |
| 5,479,541 A | * | 12/1995 | Pan | 385/22 |
| 5,666,448 A | * | 9/1997 | Schoenwald et al. | 385/44 |
| 5,757,994 A | * | 5/1998 | Schoenwald et al. | 385/44 |
| 5,809,197 A | | 9/1998 | Delbare et al. | 385/139 |
| 6,257,771 B1 | * | 7/2001 | Okayasu | 385/89 |
| 6,259,841 B1 | * | 7/2001 | Bhagavatula | 385/47 |

FOREIGN PATENT DOCUMENTS

| | | |
|---|---|---|
| EP | 0 683 409 A1 | 5/1994 |
| EP | 0 908 747 A1 | 4/1999 |
| EP | 1 247 129 B1 | 11/2003 |
| GB | 2 193 816 A | 7/1986 |
| GB | 2 273 207 A | 12/1993 |
| GB | 2 322 479 A | 10/1997 |
| GB | 2 340 959 A | 8/1999 |
| JP | 59101216 | 6/1984 |
| JP | 04-503445 | 6/1992 |
| JP | 10126018 | 5/1998 |
| WO | WO92/18888 | 10/1992 |
| WO | WO98/18301 | 4/1998 |
| WO | WO98/25862 | 6/1998 |
| WO | WO 98/30925 | 7/1998 |

* cited by examiner

INTERFACING OPTICAL TRANSMISSION STRUCTURES

The present invention concerns improvements relating to interfacing optical transmission structures and more particularly, thought not exclusively, to an apparatus for coupling a first optical transmission means, such as an optical fibre, embedded within a composite such as an aircraft panel to a second optical transmission means, such as an optical fibre, external to the composite. The present invention also concerns such an apparatus which can provide a coupling in a minimal number of steps thereby simplifying the coupling procedure.

The phrase 'embedded within a composite' in the context of the present invention is intended to mean that, at a possible point of connection, the article is completely surrounded by the composite and is located beneath the exterior surfaces of the composite after manufacture. Such an embedded article is not exposed to the exterior surface and can only be accessed by entering the interior of the composite, and so the phrase 'embedded within a composite' should be taken to include a position within a composite that contains a passageway for accessing the article.

The term 'composite' as used herein is to be construed broadly, in that it is directed to any support structure for carrying a light transmission means. Typical composites are aircraft panels, and other supportive structures made from plastic materials, carbon fibre, glass or metal for example and include multi-layer structures.

The use of optical fibres and advanced composites is becoming more accepted in the aircraft industry over the previous systems of lightweight metals and electrical wiring. There are many advantages to the use of optical fibres, such as reduced weight, elimination of electromagnetic problems, such as noise pick up and incidental radiation of signals, lower raw material costs, and elimination of potentially dangerous conductive paths. Whilst these advantages are clearly desirable, the use of optical systems in aircraft has its own specific characteristics, different to those associated with conventional systems, which have to date slowed acceptance of this new technology.

Fibre optics embedded in composite structures can provide elegant distributed and embedded sensing functions (e.g. of strain, temperature) as well as the potential for embedded communications links. Despite the proven functionality of such embedded optical fibre structures, problems remain as to the best way of interfacing (i.e. launching and extracting light) to/from the embedded optical fibres. One way, described in U.S. Pat. No. 5,299,273, involves attaching a relatively large optical connector to a composite laminate part having an optical fibre embedded therein. The optical connector is attached by trimming the structure across the path of the optical fibre thereby exposing an end of the fibre that lies flush with the surface of the structure. Then the optical fibre is polished and the connector is fitted using micro-positioning techniques to correctly align the connector and optical fibre.

Other current solutions include allowing delicate embedded fibres to emerge from the structure surface or edge (so called 'flying leads'), or embedding fibre connectors in a surface of the composite at the ends or sides of embedded optical fibres for subsequent connection to external optical devices or other optical fibres. Examples of the latter type of coupling are shown in U.S. Pat. No. 5,809,197 and in the paper by S. Meller, J. Greene, C. Kozikowski, K. Murphy, R. Claus, "Polymer and Metal-Matrix Composite-Embedded Optical Fibres for Avionics Communications Links," SPIE Proceedings, Vol. 3042, pp. 383–388, 1997.

The provision of 'flying leads' is problematical in that these are potential single points of failure during use of the composite. As well as being prone to damage, the fibres must be managed during composite manufacture (lay-up) which will increase manufacturing complexity, time and cost. Likewise, the provision of conventional embedded connectors at the composite surface can also complicate the manufacturing process particularly since these embedded connectors tend to be rather bulky and require careful protection. Additionally, resin accretion can occur round these connectors (and also in the case of flying leads) which can lead to embrittlement and contamination effects.

Generally, all of the above methods suffer from the problems of potential damage to the optical fibres emerging out of the composite and to the embedded connectors present at the surface of the composite when the composite needs to be 'finished' in its manufacturing process. These problems have hindered the universal acceptance of embedded optical fibre systems within the aircraft industry.

It is desired to overcome or at least substantially reduce the above described problems.

The present invention resides in the appreciation that embedded optical connectors need not be exposed at a surface of the composite until after manufacturing processes, such as trimming and routing, on the composite have been completed. Once these manufacturing processes are complete, the embedded optical connector can be located and a passageway to it formed in the composite. In this way, the above described problems can be substantially alleviated.

More specifically, according to one aspect of the present invention there is provided a composite aircraft panel comprising an optical transmission means and an optical processing means optically connected to the optical transmission means for processing light to or from the optical transmission means, both the optical transmission means and the optical processing means being embedded within a carrier, wherein the optical processing means comprises means for collimating a light beam and the composite further comprises a high quality optical interface surface, as defined herein, provided within the carrier for connection with the optical transmission means by the optical processing means, the optical interface surface providing a means for optical connection to transmission means from outside the carrier.

The present invention allows the optical transmission means to be hidden (inaccessible) within the composite, until such time as required, namely post manufacture of the composite. Then access to the transmission means can be recovered as required. This concept of complete embedment and recovery, post-manufacture also advantageously allows redundancy to be built into the composite. Spare embedded optical transmission means and interface optics could be embedded within the composite but remain hidden in the structure until required, for example if an existing optical transmission means and interface becomes damaged. These links would also be hidden at the time of manufacture of the composite and require no external management of delicate trailing leads for example. When a new optical communication channel or sensing function is required, the location of a selected transmission means and its high-quality interface surface can be detected and an appropriate passageway to the interface formed for access thereto. Accordingly, additional links and/or sensing functions can be provided without the need for additional optical transmission means external to the composite.

The present invention also provides benefits in terms of reduced manufacturing complexity, time and cost. The total number of operations required to establish a connection may also be reduced as compared to the conventional systems. Furthermore, it is considered that the present invention will speed the implementation of embedded optical fibre systems in the aerospace industry.

Whilst there is always some loss with an optical coupling, the optical processing means can enhance a signal at the optical interface to improve the efficiency of the optical coupling. In addition, the light from the transmission means can be manipulated to optimise its extraction from the composite.

The high-quality optical interface surface is provided at the time when the first optical transmission means is embedded within the composite. The term 'high-quality optical interface surface' as used in the present invention is intended to denote a surface which can be coupled to another optical surface and provide an acceptable optical interface (having an acceptably low level of signal loss) without the need for quality enhancing measures such as polishing of the surface. By providing such a high-quality surface, the interconnection to the first optical transmission means is made simpler in that there is no need to provide extra processing steps, such as polishing, to create an acceptable quality optical interface for light transmission.

Preferably the composite comprises a passageway formed within the carrier to the embedded optical transmission means from an exterior surface of the carrier. This is conveniently formed after the manufacturing processes have been completed such that the optical transmission means and its high-quality optical interface are not damaged by the processes.

The composite may further comprise a protective plug provided in the passageway for closing the passageway; the protective plug being removable prior to forming an optical connection. In this way, access to the first optical transmission means advantageously can be established prior to completion of any manufacturing processes on the composite and the optical transmission means and its high-quality optical interface can be protected by the provision of the plug.

When the passageway is to be formed using a laser, the composite preferably further comprises means for preventing light used in the laser irradiation from being optically coupled with the optical transmission means. The purpose of such means is to prevent any damage occurring to the optical transmission means which may be caused by the wavelength of the laser radiation.

In this regard, the preventing means is preferably arranged to differentiate between the wavelengths of the light used in the laser machining step and the light used in the optical transmission means, and to prevent transmission of light used in the laser machining step to the optical transmission means. This provides a way of preventing optical coupling between the laser light and the optical transmission means which advantageously uses a minimal number of components. The two wavelengths can be differentiated e.g. by a wavelength selective mirror or beam splitter. Once the two wavelengths of light can be differentiated, one additional way of preventing the optical coupling is for the preventing means to be arranged to transmit the light used in laser the machining step to at least one light beam absorbing means provided within the composite.

In order to determine the location of the optical transmission means and its interface, the composite may further comprise an embedded detectable location means arranged to indicate the location of the high-quality optical interface surface within the composite. This is useful when the material of the composite and the optical transmission means are not easily differentiated by the locating process.

The locating means may comprise an embedded position marker within the carrier. In addition, the composite may comprise a depth marker also embedded within the carrier to indicate when the passageway has been formed to the correct depth. This is particularly useful in laser machining where the light used for ablation can also be monitored for reflection to determine when a reflective marker representing a correct depth has been reached.

In an embodiment of the present invention, the depth marker comprises the position marker and hence the number of additional components is advantageously reduced. Also, the position marker or the depth marker may comprise a sacrificial coating which is arranged to be removable after formation of the passageway to access the optical transmission means. In this way, the precise depth of the passageway can be controlled with high accuracy.

The optical transmission means may comprise a thermal expanded core optical fibre at its optical interface surface. This reduces the alignment constraints at the point of interconnection thereby easing the interconnection process.

The composite may further comprise an alignment structure embedded within the carrier for aligning an interface means with the optical transmission means at the optical interface surface. The use of an alignment structure advantageously speeds up the interconnection process as an accurate interconnection can be made without undue delay which may otherwise be caused by the use of other alignment procedures.

For example, the optical processing means may comprise means for steering a light beam. More specifically, the steering means may comprise a beam splitter or a micro-turning mirror. The light beam collimating means may comprise a graded index lens or a graded index fibre. All of these different means for manipulating the light beam can advantageously configure the interfacing process to optimise transmission characteristics regardless of the desired location of input/output to/from the composite.

The composite may further comprise a micro-substrate on which the optical processing means is provided and secured to the optical transmission means. This advantageously provides a secure, strain-relieving connection between the optical processing means and the optical transmission means. Furthermore, the orientation of the optical processing means can be controlled as the micro-substrate may be more readily alignable than the optical processing means itself.

The alignment structure is preferably provided on the micro-substrate. In this way, a single micro-structure need only to be prepared to implement several functions without the need for other specialist structures. This advantageously reduces costs.

The optical transmission means may comprise an elongate structure and the optical interface surface may be provided at a side of the elongate structure. In this case, the optical interface surface is preferably provided by an evanescent coupling means optically connected to the optical transmission means. This is an efficient way of dividing out some of the optical signal from the optical transmission means.

The optical transmission means preferably comprises an optical fibre because this is one of the most cost-effective and efficient optical transportation systems currently available.

The composite preferably comprises micro-optical components or an assembly of components which are completely embedded along with the fibre at the time of manufacture. The micro-optics package could be based on a number of technologies. GRIN (Graded Index) lenses or fibres could be interfaced (e.g. spliced) to the embedded system fibre to provide beam collimation (for eased alignment to the other half of the interface).

It is necessary to 'find' the buried micro-optics with the machining laser (or alternative process). However, the target site could be readily identified prior to machining by embedding structures (e.g. metallic coatings) that would be visible on X-ray of the composite.

It is possible for the composite to comprise TEC optical fibres, possibly spliced to the embedded optical fibre or formed at the end of the system fibre to expand the core of the embedded fibre to relax alignment constraints at the point of connection.

The present invention enables a composite to be formed with embedded optical fibres and micro-optical components. The composite can be processed through any number of manufacturing steps until a finished composite is created. Then by X-ray imaging of the composite, the location of the optical fibres and the micro-optical components can be determined and markings can be provided for subsequent use on the composite. These markings represent drilling points for accessing the embedded optical fibres and the micro-optical components.

Presently preferred embodiments of the present invention will now be described with reference to the accompanying drawings. In the drawings.

Figure 1A:
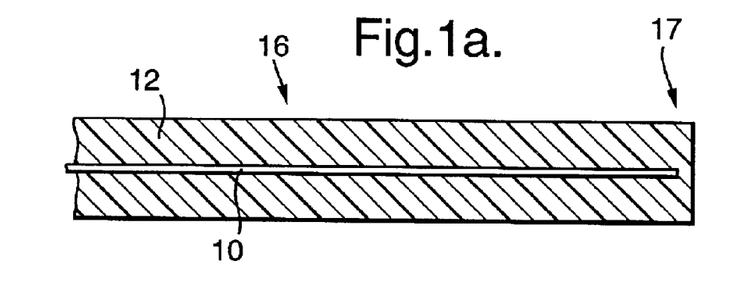
FIGS. 1a, 1b and 1c are schematic partial sectional views of an aircraft composite incorporating an optical fibre showing different stages of a method of interfacing to the embedded optical fibre as described in our co-pending UK patent application.
Figure 1B:
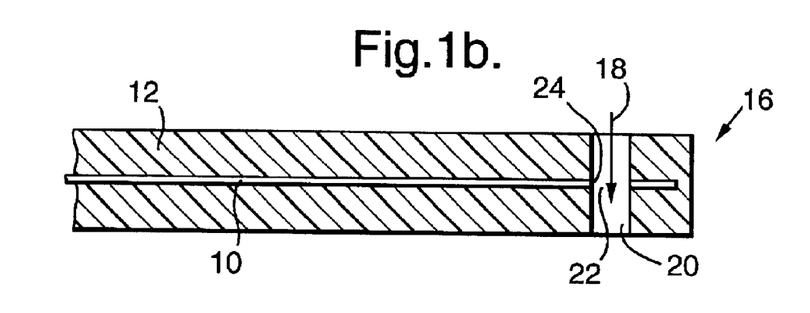
Figure 1C:
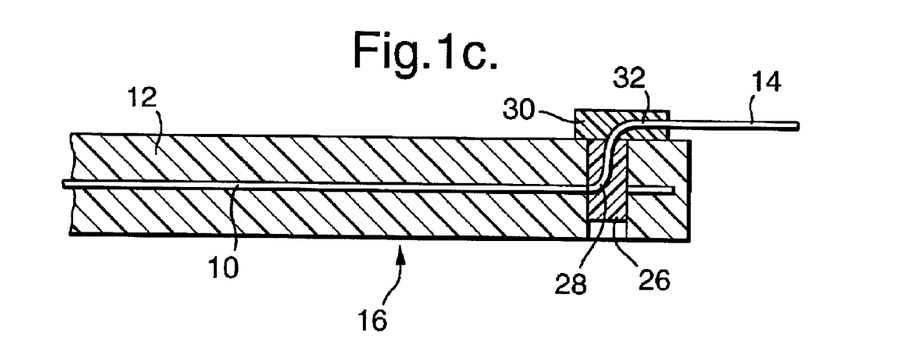

Referring to FIGS. 1a, 1b and 1c, a method of coupling an optical fibre 10 embedded within a carbon fibre aircraft composite 12 to another optical fibre 14 provided externally of the composite 12 as set out in our co-pending UK patent application, is now described. The optical fibre 10 is embedded at the time of manufacture of the composite 12 and is effectively hidden from the exterior surfaces 16 of the composite 12 at all possible points of connection as the optical fibre 10 does not extend to a connection surface 16 of the composite 12. In this way, the connection surfaces 16 of the composite 12 can be finished in the manufacturing process without damaging the optical fibre 10.

FIG. 1a shows one end 17 of the aircraft composite 12, having the optical fibre 10 embedded therein, which has been through the finishing processes of manufacturing. Although not shown, the other end of the composite 12 may be similar to that shown in FIG. 1a. In order to form an optical connection to the embedded optical fibre 10, the composite 12 is scanned by X-rays and the results thereof establish the exact location of the optical fibre 10 within the composite 12. It is not necessary to provide any special detection feature of the structure within the composite, as the location of the optical fibre can be readily determined. If image enhancement of the embedded structure is required, selective fibre coating (prior to embedment) could be used. The results are used to determine a drilling point 18 for creating access to the buried optical fibre 10 from the exterior of the composite 12.

Access to the buried optical fibre is established in the composite 12 by drilling a hole (passageway) 20 from the determined drilling point 18 through the composite 12 as shown in FIG. 1b. Hole drilling is an accepted production practice and is routinely performed in composite manufacturing. The thus formed passageway 20 intersects the optical fibre 10 and severs it. In order to reinstate an optical finish on the face of the optical fibre 10, namely to form a high-quality optical interface at the severed portion 22 of the optical fibre 10, the severed portion 22 is then polished using a standard polishing process which requires no further explanation herein. However, it is to be appreciated that the polishing process is carried out from within the passageway 20.

A plug connection is then made to the polished end 24 of the severed optical fibre 12 as shown in FIG. 1c. More particularly, a connector plug 26 having an internal optical transmission path 28 is inserted in the passageway 20 and positioned so as to optically align one end of the transmission path 28 with the polished severed end 24 of the optical fibre 10. The connector plug 26 functions to introduce/extract light to/from the embedded optical fibre 10 via the internal optical transmission path 28. Any alignment technique can be used, but in the present embodiment, alignment is built into the connector plug 26 by use of a three-axis translation micropositioning mechanism (not shown) which moves the internal optical transmission path 28 to optimise the optical coupling before fixing the relative position of the path and the plug 26 in the passageway 20 and hence the optical alignment.

An interface connector 30 is optically coupled to the other end of the internal optical transmission path 28 of the connector plug 26. In its connected state as shown in FIG. 1c, an internal optical path 32 within the interface connector 30 leads from the connector plug 26 to the external optical fibre 14 which is attached to the interface connector 30. In this way, an optical connection between the embedded optical fibre 10 and the external optical fibre 14 can be established.

Whilst the connection between the embedded optical fibre 10 and the external optical fibre 14 has been shown at one end 17 of the composite 12, the above described connection procedure could be carried out at both ends of the composite 12. This procedure would connect external optical fibres 14 to either ends of the embedded optical fibre 10 which has no portion emerging from any exterior surface 16 of the composite 12. In this way, an optical fibre 10 completely encased within a composite 12 can be used for the transmission of optical signals or the sensing of environmental conditions to which the composite is exposed.

In an alternative (not shown) to the above described interconnection method, alignment constraints can be eased by using an expanded core fibre, such as a TEC (Thermally Expanded Core) optical fibre, at the interface site where the embedded optical fibre 10 has been severed. More particularly, the TEC optical fibre is spliced onto the optical fibre 10 and embedded within the composite. When the composite is scanned, the X-ray results identify the TEC optical fibre portion and the location of the drilling point 18 is set to create a passageway which will intersect this portion.

Figure 2A:
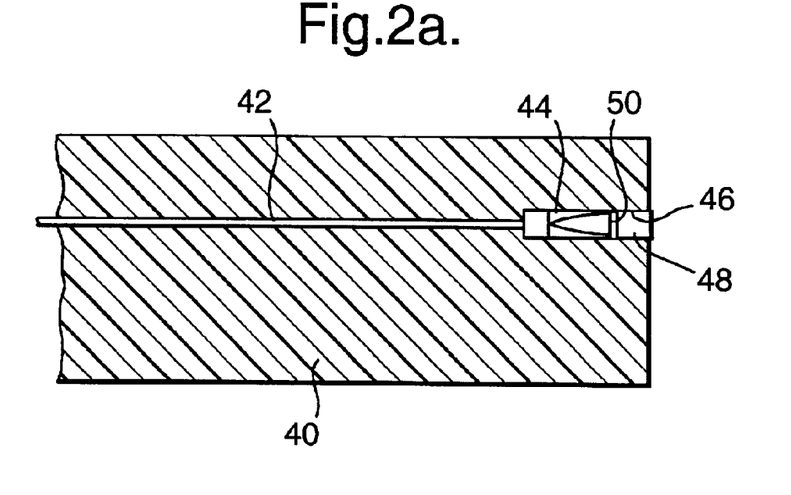
FIGS. 2a and 2b are schematic partial sectional views of aircraft composites each incorporating an optical fibre and an embedded optical port according to respective first and second embodiments of the present invention.

Referring now to FIG. 2a, a first embodiment of the present invention is described. As there are some similarities between the interconnection of this embodiment and the above described interconnection method, the following description will be directed to the differences between this embodiment and the above to avoid unnecessary repetition.

A composite panel 40 including an embedded optical fibre 42 is used. The optical fibre 42 has a micro-optical component 44 provided at one end thereof which is also completely embedded within the composite panel 40 at the time of its manufacture. The micro-optical component 44 comprises e.g. a GRIN (Graded Index) lens which is bonded or fused to the embedded optical fibre 42 to provide beam collimation for eased alignment with another half of the interface (plug connector 26 and interface connector 30 as in the first embodiment). Alternatively, the GRIN lenses can be replaced by an appropriate length of GRIN (Graded Index) fibre.

Prior to finishing of the manufacturing processes on the composite panel, the location of the micro-optical component 44 is determined by use of an imaging technique such as X-ray scanning and a passageway 46 to the micro-optical component 44 is formed, by drilling for example. The passageway 46 in this embodiment is formed in-line with the micro-optical component 44 via an end face of the composite 40. The thus formed passageway 46 is then temporarily sealed with a protective plug 48 to protect the embedded micro-optical component 44 from the subsequent composite finishing processes. Once the finishing processes have been completed, the plug 48 can be removed to provide access to the buried micro-optical component 44 and hence the embedded optical fibre 42. Removal of the plug 48 thereby provides an interface port to the embedded optical fibre 42 via an embedded high-quality optical surface 50 provided by the micro-optical component 44. Links to the outside world are then installed using a connector plug and interface connector (not shown) in a similar way to the first described interconnection method.

If required, the high-quality optical surface 50 can be covered with a protective coating (not shown) which is removable by chemical etching for example, just prior to forming the optical connection. In addition, whilst GRIN lenses have been used in the above described embodiment, it is also possible to replace these with GRIN fibres that perform essentially the same operation.

Figure 2B:
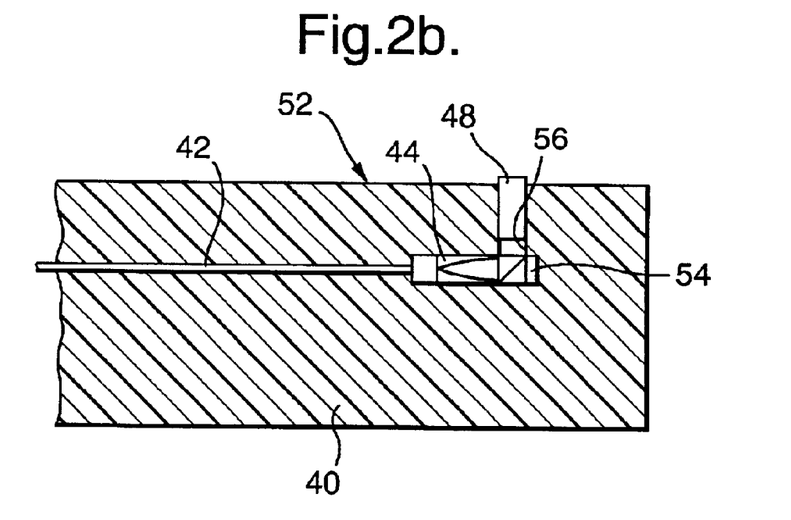

A second embodiment of the present invention is now described with reference to FIG. 2b. The second embodiment is very similar to the first embodiment and, accordingly, to avoid unnecessary repetition, only the differences will be discussed hereinafter.

In the second embodiment, it is desired to connect to the embedded optical fibre 42 from an upper side face 52 of the composite 40. Accordingly, the micro-optical component 44 is provided with a micro-turning mirror 54 for controllably steering the direction of light emitted from the embedded optical fibre 42 via the micro-optical component 44. In the present embodiment, the light is reflected and turned through 90° using the micro-turning mirror 54 having a 45° mirror angle. As the resultant light beam is steered towards the upper side surface 52 of the composite 40, a passageway 56 is provided from the upper side surface 52 of the composite 40 to the micro-turning mirror 54. The passageway 56 is then sealed with the protective plug 48 until the manufacturing processes being carried out on the composite 40 have been completed as in the previously described first embodiment. The formation of ports could be performed after composite finishing, where the plugs merely provide protection of the interface until some later time when the connection is made.

An alternative light beam processing element to the micro-turning mirror 54, which could be used if required to provide beam steering, is a beam splitter (not shown). Other micro-optical structures that could be embedded include gratings, wave-guides, evanescent couplers, wave-plates, holograms and optical filters. These structures could be involved in system interrogation as well as providing an optical interface.

Figure 3A:
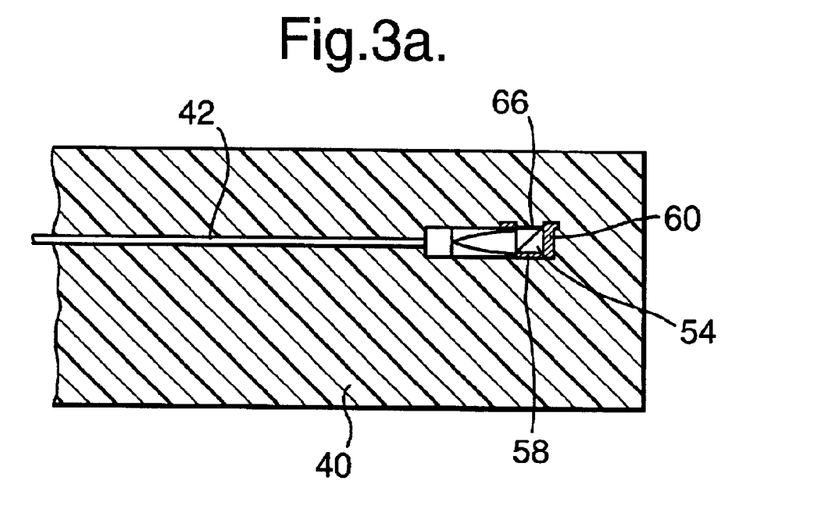
FIG. 3a is a schematic partial sectional view of an aircraft composite incorporating an optical fibre and an embedded optical port according to a third embodiment of the present invention.

Referring now to FIG. 3a, a third embodiment of the present invention is now described. The third embodiment is similar to the second embodiment described above and accordingly only the differences will be described hereinafter. In this embodiment, the composite is manufactured and finished without any pre-formed and plugged passageway to the optical processing element. Rather, the passageway is only formed after manufacture of the composite has been fully completed. More specifically, the composite panel 40 comprises an embedded optical fibre 42, beam collimating micro-optical component 44 and a beam turning mirror 54 as in the second embodiment. However, the turning mirror 54 has specific wavelength selectivity as will be described in detail later. The composite also comprises a machining beam stop 58 provided at an underside of the turning mirror 54 and a metallic position marker 60 which is readily detectable by an imaging technique.

Figure 3B:
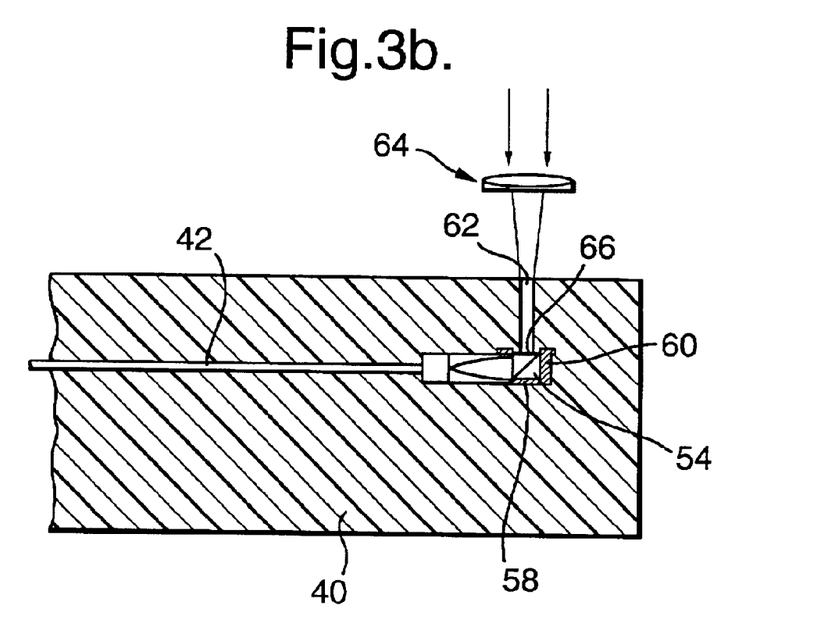
FIG. 3b is a schematic partial sectional view of the aircraft composite of FIG. 3a showing a method of forming a laser machined passageway to the embedded optical port.

Once the composite has been completed, it is X-rayed to determine the precise location of the position marker 60. A drilling point (not shown) is determined and marked on the composite surface. Then a precision laser machining technique as illustrated schematically in FIG. 3b is used to create a passageway 62 from the drilling point through the composite 40 to the position marker 60 and the turning mirror 54. An Eximer laser (for example) together with focusing optics 64 are used as it allows accurate and controlled ablation of composite panel material (e.g. carbon fibre) on a pulse by pulse basis.

This approach requires protection of the embedded optical fibre 42 and micro-optical component 44 to ensure that they are not damaged during the laser machining process. Accordingly, the top surface of the turning mirror 54 is provided with a protective sacrificial coating 66 that can be removed by the Eximer laser after the passageway 62 has been formed. The coating 66 is metallic and aids the machining process because the light reflectivity of the bottom of the passageway 62 is monitored during its formation such that it is possible to determine when this coating 66 had been reached, namely when the passageway is at the correct depth. Then the laser can be set to remove a predetermined thickness of material corresponding to the thickness of the protective coating. Alternatively, the coating can be made of a material such as copper which can be selectively ablated by the laser (due to specific light wavelength absorption characteristics) or selectively chemically etched without damaging the surfaces of the carbon fibre composite 40. In modification to the present embodiment, the position marker (target) 60 can be omitted and the metallic coating 66 can provide its function as it is readily detectable by the X-ray imaging technique.

In the present embodiment, the optical transmission wavelengths and laser machining wavelengths are selected to be different. Also, the turning mirror 54 has a wavelength selective reflectance characteristic to ensure that the machining laser radiation is not coupled into the embedded optical fibre 42. More specifically, the turning mirror 54 has a characteristic which transmits the laser machining wavelengths of light and reflects the optical transmission wavelengths of light. The absorbing beam stop 58 is positioned so as to absorb the laser radiation once it has created the passageway 62 and has been transmitted through the turning mirror 54.

Once the passageway 62 has been created, the connection to the embedded optical fibre 42 is carried out in a similar manner to that described in the previous embodiments.

A fourth embodiment of the present invention is now described with reference to FIGS. 4a, 4b, 5a, 5b and 5c. In this embodiment, the coupling to an optical fibre 70 is effected to a side portion thereof to form a so called evanescent coupling. The purpose of having evanescent coupling is that it enables a branching structure to be created such that the signal being transmitted along the optical fibre 70 can be split between the existing embedded optical fibre 70 and another optical fibre 72 external to a composite 74 in which the fibre 70 is provided. This form of coupling is used to allow side-access to fibres in an efficient way.

Figure 4A:
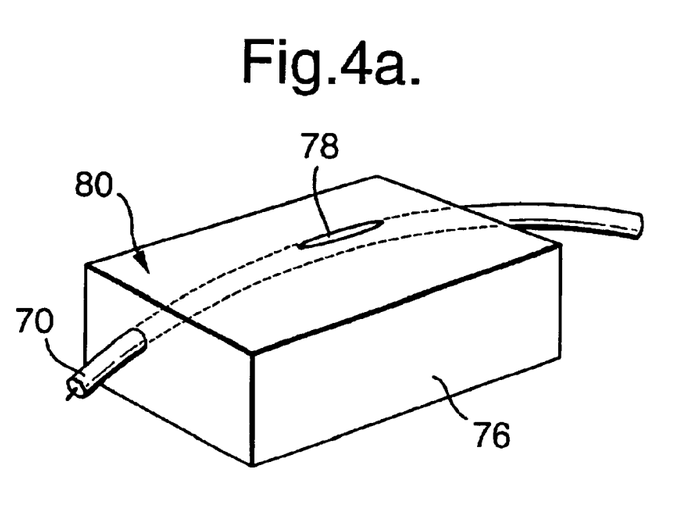
FIG. 4a is a schematic perspective view of an optical fibre in a polishing block which is used to prepare the optical fibre for side coupling in a fourth embodiment of the present invention.
Figure 4B:
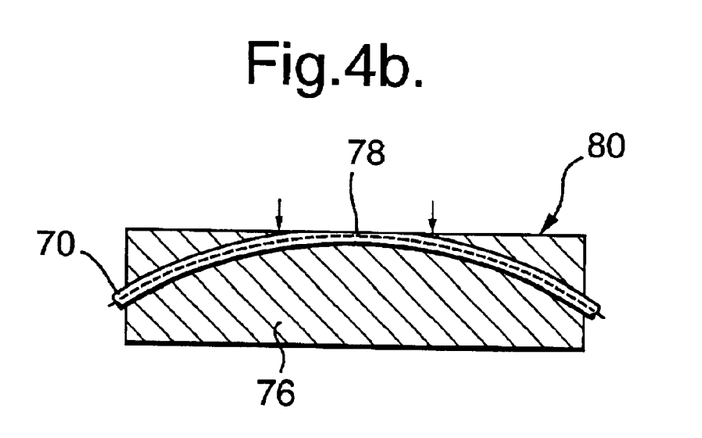
FIG. 4b is a schematic sectional view of the polishing block and optical fibre of FIG. 4a along the length of the polishing block.

FIGS. 4a and 4b show a pre-conditioning procedure employed for creating a side coupling to the optical fibre 70. The procedure involves placing the optical fibre 70 in a polishing block 76 which is arranged to retain the optical fibre 70 with a side portion 78 slightly protruding from a polishing surface 80 of the block 76. The protruding side portion 78 of the optical fibre 70 is then polished using any standard polishing technique which is well known to the skilled addressee.

Once the side portion has been polished, the optical fibre 70 is embedded within the composite 74 in such a way as to facilitate coupling to the polished portion 78. More particularly, as can be seen clearly in FIG. 5a, an embedded evanescent coupler block 82 is provided at the polished side region 78 to provide support for the optical fibre 70 at the predetermined point of connection. The optical fibre 70 and the coupler block 82 are embedded within the composite 74 such that any manufacturing processes acting on the exterior surfaces of the composite do not cause any effect to the optical fibre 70 or the coupler block 82.

Figure 5A:
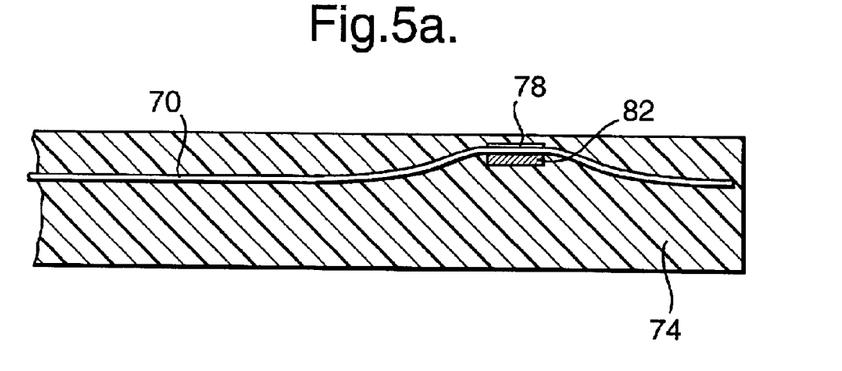
FIGS. 5a, 5b and 5c are schematic partial sectional views of an aircraft composite incorporating the polished optical fibre of FIGS. 4a and 4b showing different stages of a method of interfacing to the embedded optical fibre according to the fourth embodiment of the present invention.
Figure 5B:
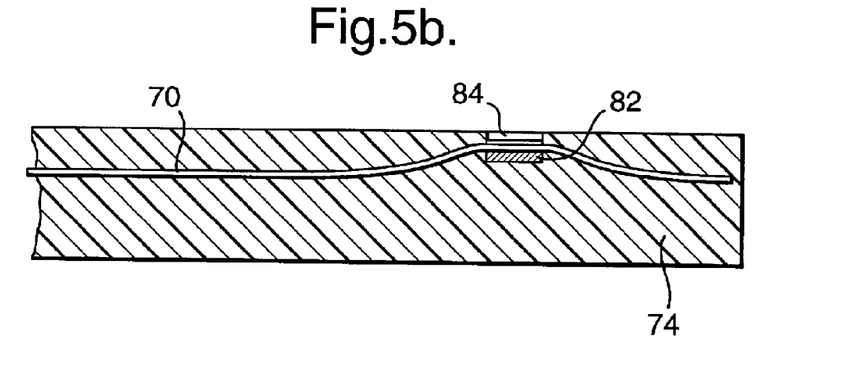

In this embodiment, the coupler block 82 also acts as a post-manufacture position locator for a coupling point and is easily detected by the results of an X-ray scan of the composite 74. Once the scan is completed, a machining point is determined for machining down to the coupler block 82 and the composite 74 is machined to create a shallow passageway 84 for access to the polished side portion 78 of the optical fibre 70 as shown in FIG. 5b.

Figure 5C:
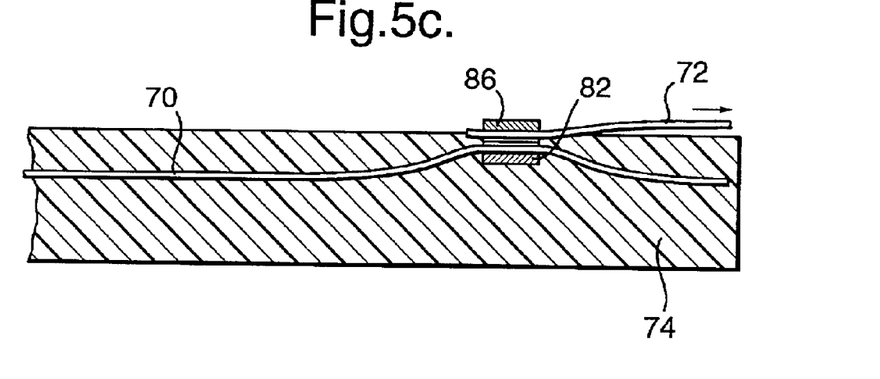

The thus formed passageway 84 is of a size sufficient to house an evanescent interface coupler block 86. The interface coupler block 86 supports an end of the external optical fibre 72 which also has a polished side surface. In order to effect coupling, the interface coupler block 86 and the coupler block 82 are connected together to optically align the respective polished side portions of their optical fibres 70, 72.

In another embodiment (not shown), the optical fibres 70, 72 with polished side portions are replaced by D-fibres in the composite 74. D-fibres are similar to side polished fibres and have a flat side close to the fibre core which gives them a reduced alignment tolerance compared to other optical fibre geometries. At a region of connection, the D-fibres are provided with support blocks for ease of interfacing.

Figure 6A:
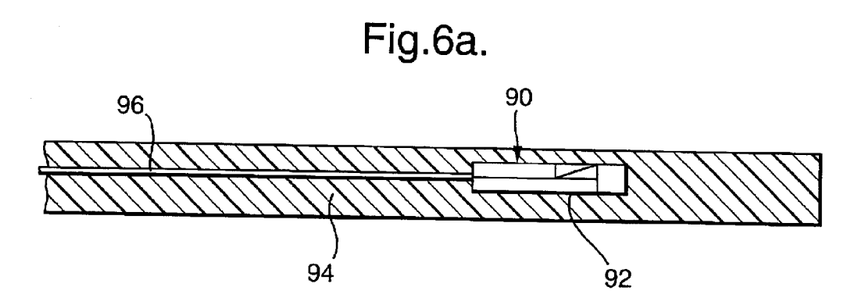
FIG. 6a a schematic sectional view in a vertical plane of an aircraft composite incorporating an optical fibre and an embedded optical port according to a fifth embodiment of the present invention.
Figure 6B:
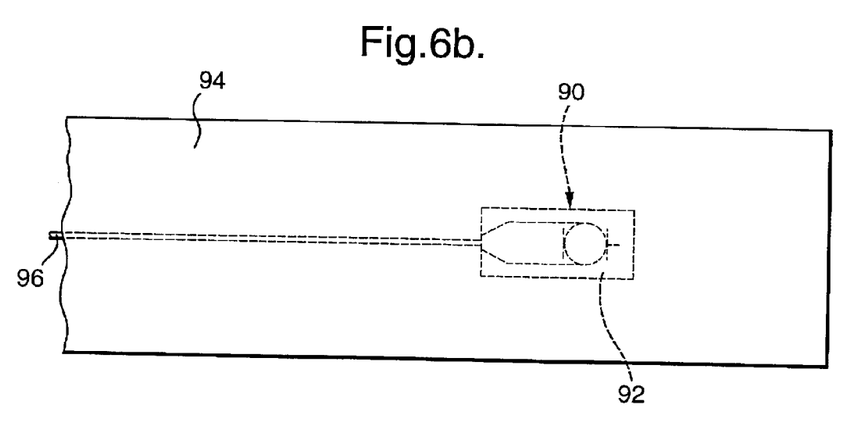
FIG. 6b a schematic sectional view in a horizontal plane of the aircraft composite of FIG. 6a according to the fifth embodiment of the present invention.

A fifth embodiment of the present invention, as shown in FIGS. 6a and 6b, is now described. This embodiment is also very similar to the previously described third embodiment and, so to avoid unnecessary repetition, only the differences are described hereinafter.

The principle difference is that, for ease of manufacture, the micro-optical component 90 is formed on a micro-substrate 92 that is also embedded within the composite panel 94. The micro-substrate 92 is formed from silicon though alternatively other materials can be used. The machining of silicon is relatively easy and enables connecting structures such as grooves, pockets, reflectors and alignment markers (not shown) to be formed. These connecting structures perform two connectivity functions. Firstly they enable the micro-optical component 90 and the optical fibre 96 to be aligned and secured together with high precision on the micro-substrate 92, and secondly, they enable the combination of the micro-optical component 90 and embedded optical fibre 96 to be coupled to the external connector (not shown) accurately and reliably. The micro-substrate 92 is embedded at the time of composite manufacture.

The micro-optical component 90 can comprise lenses/optics/prisms as well as windows or coatings to protect their optical surfaces prior to being exposed for connection. All of the assembly is embedded during manufacture. It can also include target markers for X-ray/C-scan location of the assembly.

A process that can be used to create alignment structures for the micro-optical components 90 is the so called LIGA (Lithographie Galvanoformung and Abformung) process which is based on X-ray lithography. This process uses deep X-raying of a resist layer and subsequent electroplating to form accurately aligned structures. This can provide alignment structures in metals and ceramics and (from a master structure) allow high-volume replication in other materials such as composites manufactured out of strong plastics materials such as PMMA (Polymethylmethacrylate) and PEEK (Polyetylethylkeytone). The substrate 92 can be formed from various processes, this is but one. Other processes include etching of silicon or laser machining. The aligned substrate 92 and micro-optical components 90 are designed to be rugged enough to survive both the manufacturing process and the operational environment of the aircraft/composite structure.

Some optical processing elements, especially those without rotational symmetry may be susceptible to misalignment during the composite cure process. A substrate containing these elements would minimise such movement. The natural ply structure of the composite material may also make the substrate lie 'flat' further improving alignment to other structures.

Other micro-optical structures that could be used as the beam processing elements in the above embodiments include gratings, wave-guides, evanescent couplers, waveplates, holograms and optical filters. These structures could be involved in system interrogation as well as providing an optical interface.

Having described particular preferred embodiments of the present invention, it is to be appreciated that the embodiments in question are exemplary only and that variations and modifications such as will occur to those possessed of the appropriate knowledge and skills may be made without departure from the spirit and scope of the invention as set forth in the appended claims. For example, whilst X-ray imaging is a preferred way of detecting the location of the embedded optical fibre and/or the micro-optical components, other techniques may also be suitable such as ultrasonic imaging. Also, the use of a substrate can equally well be used to align an optical fibre to an evanescent or D-fibre coupler.

What is claimed is:

1. A composite comprising: an optical transmission means embedded within a layer of composite material; a high quality optical interface surface provided within the composite material in connection with the optical transmission means, the optical interface surface providing a means for optical connection to the transmission means from outside the composite material; a micro-substrate embedded within the composite material on which an optical processing means is provided and secured to the optical transmission means, the optical processing means being optically connected to the optical transmission means for processing light to and from the optical transmission means and for providing the optical interface surface; locating means for locating position of the high-quality optical interface surface from an exterior of the composite material, said locating means comprising a detectable position marker embedded within the composite material; and a depth marker provided by the micro-substrate; wherein the depth marker comprises the position marker.

2. The composite according to claim 1, wherein the micro-substrate is formed from silicon.

3. The composite according to claim 1, further comprising a passageway formed within the composite material to the embedded optical transmission means.

4. The composite according to claim 3, further comprising means for preventing laser irradiation light used to form the passageway from being optically coupled with the optical transmission means, by differentiating between wavelengths of laser light used to form the passageway and light used in the optical transmission means.

5. The composite according to claim 1, further comprising locating means for locating position of the high-quality optical surface from an exterior of the carrier, said locating means comprising a detectable position marker embedded within the composite material.

6. The composite according to claim 5, wherein the locating means comprises the micro-substrate.

7. The composite according to claim 1, further comprising:
a passageway formed within the composite material to the embedded optical transmission means; and
locating means for locating position of the high-quality optical interface surface from an exterior of the composite material, said locating means comprising a detectable position marker embedded within the composite material;
wherein the position marker comprises a sacrificial coating which is arranged to be removable after formation of the passageway to access the optical transmission means.

8. The composite according to claim 1, further comprising:
a passageway formed within the composite material to the embedded optical transmission means;
means for preventing laser irradiation light used to form the passageway from being optically coupled with the optical transmission means, by differentiating between wavelengths of laser light used to form the passageway and light used in the optical transmission means;
a depth marker embedded within the composite material to indicate when the passageway has been formed to a correct depth, wherein the depth marker comprises a sacrificial coating which is removable after formation of the passageway to access the optical transmission means.

9. The composite according to claim 1, further comprising an alignment structure embedded within the composite material for aligning an interface means with the optical transmission means via the optical interface surface.

10. The composite according to claim 9, wherein the alignment structure is provided by the micro-substrate.

11. A composite comprising:
an optical transmission means embedded within a layer of composite material;
a high-quality optical interface surface provided within the carrier in connection with the optical transmission means, the optical interface surface providing a means for optical connection to the transmission means from outside the composite material, via a passageway formed by laser irradiation;
a micro-substrate embedded within the composite material on which an optical processing means is provided and secured to the optical transmission means, the optical processing means being optically connected to the optical transmission means for processing light to and from the optical transmission means and for providing the optical interface surface;
means for preventing laser irradiation light used to form the passageway from being optically coupled with the optical transmission means, by differentiating between wavelengths of laser light used to form the passageway and light used in the optical transmission means;
locating means for locating position of the high-quality optical interface surface from an exterior of the carrier, said locating means comprising a detectable position marker embedded within the composite material; and
a depth marker embedded within the composite material to indicate when the passageway has been formed to a correct depth.

12. The composite according to claim 11, wherein the depth marker is provided by the micro-substrate.

13. A structural component, comprising:
a layer of composite material forming said structural component in a desired configuration;
an optical transmission medium embedded within said layer of composite material;
a high-quality optical interface surface provided within the layer of composite material, said optical interface surface providing a means for optical coupling to the transmission medium from outside the composite material;
a preformed micro-substrate embedded within the layer of composite material; and
an optical processing means secured to said micro-substrate and embedded with it in said layer of composite material, said optical processing means being optically coupled to the transmission medium for processing light to or from the transmission medium, and for providing the optical interface surface.

* * * * *